United States Patent [19]

Webster et al.

[11] 3,725,398

[45] Apr. 3, 1973

[54] PROCESS FOR PREPARING 9-ARYLOXYCARBOCYANINE COMPOUNDS

[75] Inventors: Frank G. Webster; Robert C. Taber, both of Rochester, N.Y.

[73] Assignee: Eastman Kodak Company, Rochester, N.Y.

[22] Filed: Apr. 21, 1971

[21] Appl. No.: 136,177

[52] U.S. Cl. ................... 260/240.6, 96/133, 96/135, 96/137, 260/240.65
[51] Int. Cl. ............................................ C09b 23/06
[58] Field of Search ..................... 260/240.6, 240.65

[56] References Cited

UNITED STATES PATENTS 2,156,464   5/1939   Schulz ........................... 260/240.65

FOREIGN PATENTS OR APPLICATIONS 1,112,495   11/1955   France

OTHER PUBLICATIONS

Hamer, The Cyanine Dyes and Related Compounds, pages 159–160 and 186–187, Interscience Publishers, Inc. NY (1964).

Primary Examiner—John D. Randolph
Attorney—Robert W. Hampton, J. R. Frederick and W. E. Neely

[57] ABSTRACT

Process for preparing 9-aryloxycarbocyanine dye compounds which comprises reacting a 9-alkylthiocarbocyanine dye compound in the presence of a basic medium with a phenol. The 9-aryloxycarbocyanine dye compounds obtained are useful for the spectral sensitization of silver halide photographic emulsions.

24 Claims, No Drawings

PROCESS FOR PREPARING 9-ARYLOXYCARBOCYANINE COMPOUNDS

This invention relates to a novel method for the preparation of 9-aryloxycarbocyanine dyes useful for the spectral sensitization of silver halide photographic emulsions.

Certain carbocyanine dyes substituted in the 9 position with an alkoxy group, an aralkoxy group, an alkylthio or an arylthio group are known to extend the spectral sensitivity of photographic silver halide emulsions. New 9-substituted carbocyanine dyes which extend the sensitivity of the silver halide to light of longer wavelengths, are desired.

9-Aryloxycarbocyanine dyes are disclosed incidentally in U.S. Pat. No. 2,156,464 and a method for preparing them by reacting an ester of iminodicarbonic acid with a cyclammonium quaternary salt is suggested in said patent. This procedure is disadvantageous, however, in that a highly toxic intermediate, e.g., cyanogen bromide, is employed in making the iminodicarbonic ester. No examples describing the preparation of a 9-aryloxycarbocyanine dye is given in U.S. Pat. No. 2,156,464. French Pat. No. 1,112,495, discloses 9-aryloxycarbocyanine dyes but does not indicate how they can be prepared.

Accordingly, it is an object of this invention to provide an improved process for preparing 9-aryloxycarbocyanine dyes that does not involve the use of a highly toxic reagent.

This and other objects of this invention are accomplished by reacting a 9-alkylthiocarbocyanine with a phenol in the presence of a basic condensing agent.

Typically, our process comprises heating a compound having the general formula:

$$R-\overset{+}{N}(CH=CH)_{n-1}-\underset{\underset{S-R^2}{|}}{C}=CH-C(=CH-CH)_{m-1}=N-R^1 \quad A^{\ominus}$$

I wherein R and $R^1$ which can be the same or different each represents an alkyl group having 1 to 18 carbon atoms, preferably a lower alkyl group containing from 1 to 4 carbon atoms, such as methyl, ethyl, propyl, isopropyl, butyl, pentyl, hexyl, heptyl, octyl, nonyl, decyl, undecyl, dodecyl, tridecyl, tetradecyl, pentadecyl, hexadecyl, heptadecyl and octadecyl, for example, a substituted alkyl group, preferably a substituted lower alkyl group, such as a hydroxyalkyl group having 2 to 4 carbon atoms such as 2-hydroxyethyl, 2-hydroxypropyl, 3-hydroxypropyl and 4-hydroxybutyl, for example, an alkoxyalkyl group having 3 to 8 carbon atoms such as 2-methoxyethyl, 2-ethoxyethyl, 2-butoxyethyl, 3-methoxypropyl, 3-ethoxypropyl, 3-propoxypropyl, 4-ethoxybutyl and 4-butoxybutyl, for example a carboxyalkyl group having 2 to 7 carbon atoms such as carboxymethyl, 2-carboxyethyl, 3-carboxypropyl, 4-carboxybutyl, 5-carboxypentyl and 6-carboxyhexyl for example, a sulfoalkyl group having 2 to 4 carbon atoms such as 2-sulfoethyl, 3-sulfopropyl, 3-sulfobutyl and 4-sulfobutyl, for example, a sulfatoalkyl group having 2 to 4 carbon atoms such as 2-sulfatoethyl, 3-sulfatopropyl and 4-sulfatovutyl, for example, an acyloxyalkyl group having 4 to 8 carbon atoms, such as 2-acetoxyethyl, 2-propionyloxyethyl, 2-butyryloxyethyl, 3-acetoxypropyl, 4-acetoxybutyl, 4-propionyloxybutyl and 4-butyryloxybutyl, for example, an alkoxycarbonylalkyl group having 4 to 9 carbon atoms such as 2-methoxycarbonylethyl

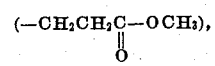

2-ethoxycarbonylethyl

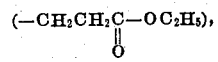

3-ethoxycarbonylpropyl, 4-ethoxycarbonylbutyl and 4-butoxycarbonylbutyl, for example, and an aralkyl group such as benzyl, phenethyl and 3-phenylpropyl, for example, an alkenyl group having 3 to 4 carbon atoms such as allyl, 1-propenyl, 2-propenyl, 1-butenyl, 2-butenyl and 3-butenyl, for example, or a phenyl group such as, for example, phenyl, o-tolyl, m-tolyl, p-tolyl, xylyl, chlorophenyl, bromophenyl, sulfophenyl, carboxyphenyl and alkoxyphenyl, such as methoxyphenyl and ethoxyphenyl, for example; Y and Z are the same or different and each represents the nonmetallic atoms required to complete a 5 to 6 membered heterocyclic nucleus selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), a naphthothiazole nucleus (e.g., naphtho[1,2-d]thiazole, naphtho[2,1-d]thiazole, naphtho[2,3-d]thiazole, 5-chloronaphtho[1,2-d]thiazole, 5-methoxynaphtho[2,1-d]thiazole, etc.), a thionaphtheno-7',6',4,5-thiazole nucleus (e.g., 4'-methoxy-thianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., naphtho[1,2-d]oxazole, naphtho[2,1-d]oxazole, etc.), a selenazole nucleus, (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., naphtho[1,2-d]selenazole, naphtho[2,1-d]selenazole, etc.), a thiazoline nucleus (e.g., thiazoline, 4-methylthiazoline, etc.), a thiazolidine nucleus (e.g., thiazolidine), a 2-quinoline nucleus (e.g., 2-quinoline, 3-methyl-2-quinoline, 5-methyl-2quinoline, 7-methyl-2-quinoline, 8-methyl-2-quinoline, 6-chloro-2-quinoline, 8-chloro-2-quinoline, 6-methoxy-2-quinoline, 6-ethoxy-2-quinoline, 6-hydroxy-2-quinoline, 8-hydroxy-2-quinoline, etc.), a 4-quinoline nucleus (e.g., 4-quinoline, 6-methoxy-4-quinoline, 7-methyl-4-quinoline, 8-methyl-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, 6-methyl-3-isoquinoline, etc.), a 3,3-dialkylindolenine nucleus (e.g., 3,3-dimethylindolenine, 3,3,5-trimethylindolenine, 3,3,7-trimethylindolenine, etc.), a 2-pyridine nucleus (e.g., 2-pyridine, 5-methyl-2-pyridine, etc.), a 4-pyridine nucleus (e.g., 4-pyridine, 3-methyl-4-pyridine, etc.), an imidazole nucleus (e.g., imidazole, 1-methylimidazole, 1-ethylimidazole, 1-butylimidazole, 1-methyl-4-phenylimidazole, 1-ethyl-4-phenylimidazole, 4,5-dimethylimidazole, 4,5-diethylimidazole, 1,4,5-trimethylimidazole, 1-ethyl-4,5-dimethylimidazole, etc.), a benzimidazole nucleus (e.g., benzimidazole, 1-methylbenzimidazole, 1-ethylbenzimidazole, 1-butylbenzimidazole, 1,4-dimethylbenzimidazole, 1-methyl-4-phenylbenzimidazole, 1-phenylbenzimidazole, 1-phenyl-5,6-dichlorobenzimidazole, 1-butyl-4-methylbenzimidazole, 1-ethyl-4-phenylbenzimidazole, 4,5-dichlorobenzimidazole, etc.), and naphthimidazole nucleus (e.g., 1-methylnaphth[1,2-d]imidazole, 1-ethylnaphth[1,2-d]imidazole; 1-methyl-5-methoxynaphth[1,2-d]-imidazole, 1-ethyl-5-methoxynaphth[1,2-d]imidazole, etc.); $R^2$ represents an alkyl group typically having 1 to 4 carbon atoms, e.g., methyl, ethyl, propyl, butyl, etc.; $A^-$ represents an acid anion such as chloride, bromide, iodide, thiocyanate, sulfamate, methyl sulfate, ethyl sulfate, perchlorate, p-toluenesulfonate, etc., and each of $n$ and $m$ represents an integer of from 1 to 2; with a phenol having the formula:

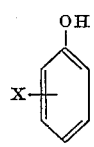

II wherein X represents a hydrogen atom, a halogen atom such as bromine of chlorine, an alkyl group typically having 1 to 4 carbon atoms, such as methyl, ethyl, propyl, isopropyl, butyl, for example, or an alkoxy group such as methoxy, ethoxy, propoxy, butoxy, for example, in the presence of a basic condensing agent, to form a 9-aryloxycarbocyanine dye.

The term "an alkyl group" as used herein and in the claims means an alkyl group having the general formula $C_nH_{2n+1}$ such as methyl, ethyl, propyl, isopropyl, butyl, pentyl, hexyl, heptyl, octyl, nonyl, decyl, undecyl, dodecyl, tridecyl, tetradecyl, pentadecyl, hexadecyl, heptadecyl and octadecyl, for example.

The 9-aryloxycarbocyanine dyes prepared in accordance with the process of this invention for the most part have the formula:

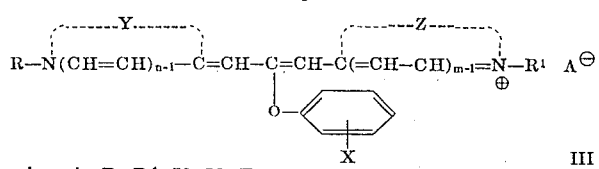

III wherein R, $R^1$, X, Y, Z, $m$, $n$ and $A^-$ have the meaning previously assigned to them.

A highly useful class of 9-aryloxycarbocyanine dyes prepared in accordance with the process of this invention is represented by the formula:

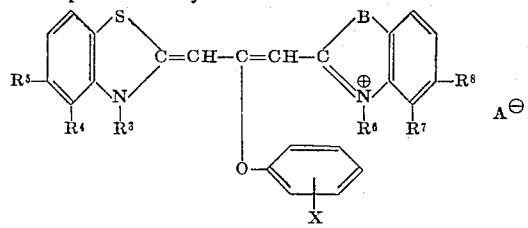

IV wherein $R^3$ and $R^6$, which can be the same or different, each represents a lower alkyl group of 1 to 4 carbon atoms such as methyl, ethyl, propyl, isopropyl or butyl, for example, preferably methyl or ethyl, each of $R^4$ and $R^7$ represents a hydrogen atom, $R^5$ and $R^8$, which can be the same or different, each represents a hydrogen atom, a lower alkyl group as defined hereinabove, preferably methyl, or a halogen atom such as chloro or bromo, preferably chloro, B represents a sulfur atom or a selenium atom, and X and $A^-$ are as previously defined, and wherein $R^4$ and $R^5$, collectively, and $R^7$ and $R^8$, collectively, represent the atoms needed to complete a fused benzo group.

In carrying out the process of the invention a 9-alkylthiocarbocyanine, a phenol and a basic condensing agent are placed in a suitable reaction vessel, such as a heat resistant glass vessel, and heated to an appropriate elevated temperature.

Basic condensing agents that can be employed in carrying out the process of the invention include trialkylamines such as trimethylamine, triethylamine, tri-n-propylamine, triisopropylamine, tri-n-butylamine, tri-n-amylamine, etc., dialkylanilines such as N,N-dimethylaniline, N,N-diethylaniline, N,N-dimethyl-m-toluidene, etc., N-alkylpiperidines such as N-methylpiperidine, N-ethylpiperidine, etc., 1,4-diazabicyclo-[2,2,2]octane, pyridine, quinoline, etc. The basic condensing agents named are intended to be illustrative an not limitative of the basic condensing agents that can be employed in carrying out the process of the invention.

Two ways of carrying out the process of the invention are described hereinafter.

In one way of carrying out the process of the invention the reactants are placed in a glass flask in a heating mantle and heated until the external surface temperature of the glass flask is in the range of about 235°C. to about 245°C., preferably about 240°C. As well known to those skilled in the art to which this invention is directed the external surface temperature of the flask can be determined by a pyrometer appropriately placed between the flask and the heating mantle. Often, the reaction is completed when the external portion of the flask being heated reaches a temperature in the rang just noted and the 9-aryloxycarbocyanine product can be separated from the reaction mixture. It is to be understood that the reaction time will vary depending on the reactivity of the reactants, the type of condensing agent employed, etc.

In those instances where the reaction is not complete, when the external surface temperature of the flask is in the range of about 235°C. to about 245°C. heating is continued at the temperatures just noted until the reaction is completed. Usually no more than 10 minutes additional heating is required.

In another way of carrying out the process of the invention the reactants are placed in a suitable reaction vessel and heated at the reflux temperature of the reaction mixture until the reaction is completed. Usually, reflux times in the range of a few minutes to about 3 hours are sufficient. Normally the refluxing reaction takes from about 10 minutes to about 2 hours.

The product obtained by carrying out the process of this invention in accordance with either of the above-described embodiments is isolated by any suitable method; for example, reaction mixtures that have been heated at a temperature above about 220°C. for a short period are conveniently cooled to ambient temperature and the crude product is precipitated by the addition of a solvent such as diethyl ether. Those reaction mixtures in which the reaction has gone to completion at the reflux temperature of the mixture, are typically poured into a solvent such as diethyl ether to precipitate the dye. Alternatively, such reaction mixtures are advantageously cooled to ambient temperature and the dye is precipitated by adding the solvent thereto.

The crude dye obtained by performing any of the above-described procedures, is collected and desirably extracted with several portions of a hot solvent such as acetone, ethanol and the like. The extracted dye can be further purified by any appropriate method. A typical procedure comprises repeated crystallization from a suitable solvent such as methanol. Another useful technique for purifying the solvent-extracted dye comprises recrystallizing several times from a solvent such as N,N-dimethylformamide and precipitating the dye after each recrystallization with a solvent such as methanol.

The reaction by which the subject dyes are formed occurs advantageously in the presence of a large excess of phenolic reactant in the range of about 20 to 75 moles of phenol per mole of 9-alkylthiocarbocyanine compound, preferably about 30 to about 55 moles of phenol per mole of said alkylthio derivative.

The intermediate 9-alkylthiocarbocyanines selected from those represented by Formula I hereinbefore, can be prepared according to the procedures described in Schulz U.S. Pat. No. 2,156,464, Kendall U.S. Pat. Nos. 2,397,013 and 2,397,014, and Van de Straete U.S. Pat. No. 2,484,536, for example.

The invention is further illustrated by the examples which follow.

Example 1 — 3,3'-Diethyl-9-phenoxythiacarbocyanine iodide

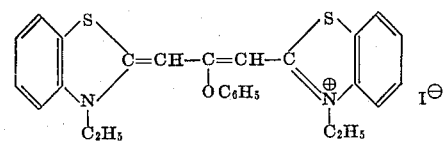

A mixture of 2.8 g. (1 mol.) of 3,3'-diethyl-9-ethylthiothiacarbocyanine iodide, 5 ml. of triethylamine and 25 ml. of phenol was heated in a flask in a heating mantle until the outside temperature of the flask reached 240°C., the solution was cooled, diethyl ether was added and the suspension was filtered. The solid that collected on the filter was extracted with three, 200 ml. portions of hot acetone. The crude dye was recrystallized twice using methanol. The yield of dark crystals with a shiny reflex was 22 percent, m.p. 272°–273°C. dec.

Example 2 — 3,3'-Diethyl-9-phenoxy-4,5;4',5'-dibenzothiacarbocyanine ethylsulfate

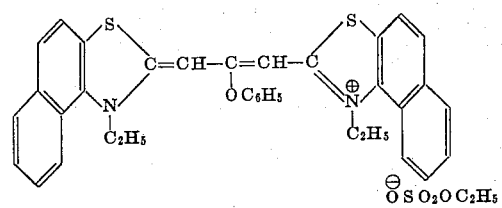

The above-named dye was prepared in the manner of Example 1, from 3.3 g. (1 mol.) of 3,3'-diethyl-9-ethylthio4,5;4',5'-dibenzothiacarbocyanine ethylsulfate, 5 ml. of triethylamine and 25 ml. of phenol. The yield of dark green crystals was 17 percent, m.p. 273°–274°C. dec.

Example 3 — 3,3'-Dimethyl-9-phenoxy-4,5;4',5'-dibenzothiacarbocyanine p-toluenesulfonate

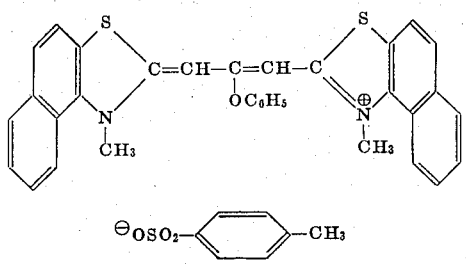

The above-identified dye was prepared according to the method of Example 1, from 3.3 g. (1 mol.) of 3,3'-dimethyl-9-methylthio-4,5;4',5'-dibenzothiacarbocyanine p-toluenesulfonate, 5 ml. of triethylamine and 25 ml. of phenol. The yield of dark crystals was 20 percent, m.p. 288°–290°C. dec.

Example 4 — 3-Ethyl-3'-methyl-9-phenoxythiacarbocyanine iodide

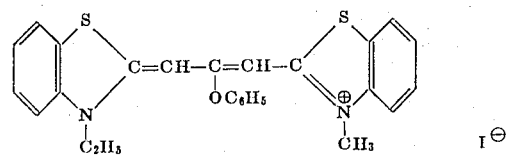

A mixture of 1.14 g. (1 mol.) of 3-ethyl-3'-methyl-9-methylthiothiacarbocyanine p-toluenesulfonate, 15 ml. of phenol and 15 ml. of triethylamine was heated at reflux for 45 minutes. The reaction mixture was poured into 250 ml. of diethyl ether and the product collected as a sticky solid. The product was dissolved in 50 ml. of methanol and treated with an excess of sodium iodide dissolved in 50 ml. of methanol. The desired dye crystallized and was collected. The dye was twice recrystallized by dissolving in dimethylformamide and precipitating the dye by the addition of methanol. The dye was obtained (yield 24 percent) as very dark crystals, m.p. 261°–262°C. dec.

Example 5 — 5-Chloro-3,3'-diethyl-9-phenoxythiacarbocyanine iodide

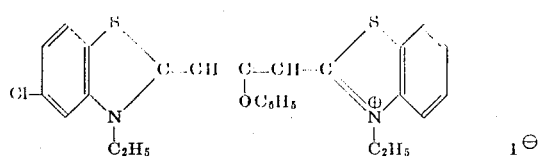

A mixture of 2.9 g. (1 mol.) of 5-chloro-3,3'-diethyl-9-ethylthiothiacarbocyanine iodide, 15 ml. of phenol and 5 ml. of triethylamine was heated at reflux for 1¾ hours. The reaction mixture was poured into diethyl ether and the product which separated was washed with ethanol and then washed twice with 50 ml. portions of boiling acetone. The dye was three times recrystallized by dissolving in dimethylformamide and precipitating the dye by the addition of ethanol. The dye was obtained (yield 24 percent) as blue-green crystals, m.p. 273°–274°C. dec.

Example 6 — 3,3'-Diethyl-9-phenoxy-4,5-benzothiacarbocyanine iodide

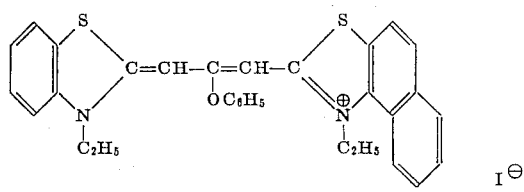

A mixture of 2.5 g. (1 mol.) of 3,3'-diethyl-9-ethylthio-4,5-benzothiacarbocyanine iodide, 20 ml. of phenol and 20 ml. of triethylamine was heated at reflux for 2 hours. The reaction mixture was poured into 250 ml. of diethyl ether and the product collected as a sticky solid. The product was dissolved in dimethylformamide, treated with 40 ml. of methanol and chilled. The crystalline dye was collected on a filter. The dye was twice recrystallized by dissolving in dimethylformamide and precipitating the dye by the addition of methanol. The dye was obtained (yield 13 percent) as dark green crystals, m.p. 234°–235°C. dec.

Example 7 — 3,3'-Diethyl-9-phenoxyselenathiacarbocyanine iodide.

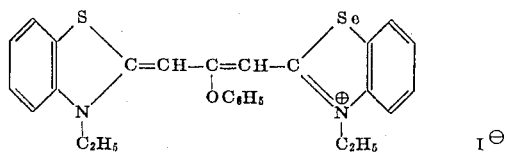

A mixture of 2.0 g. (1 mol.) of 3,3'-diethyl-9-ethylthioselenathiacarbocyanine iodide, 10 ml. of triethylamine and 10 ml. of phenol was heated in a flask in a heating mantle for 10 minutes at 240°C. The temperature was measured between the flask and the heating mantle. The reaction mixture was cooled, then poured into diethyl ether, the suspension was filtered and the solid was extracted with 250 ml. of hot acetone. The crude dye was recrystallized twice from methanol. The yield of scarlet crystals was 14 percent and they had a m.p. of 285°–286°C. with dec.

Example 8 — 3,3'-Diethyl-9-phenoxy-4,5-benzoselenathiacarbocyanine iodide

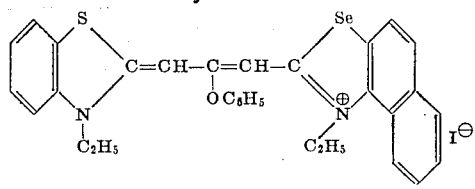

A mixture of 2.0 g. (1 mol.) of 3,3'-diethyl-9-ethylthio-4,5-benzoselenathiacarbocyanine iodide, 10 ml. of triethylamine and 10 ml. of phenol was heated in a flask in a heating mantle for 10 minutes at 240°C. The reaction mixture was cooled, then poured into diethyl ether, the suspension was filtered and the solid was extracted with 600 ml. of hot acetone. The crude dye was recrystallized twice from methanol. The yield of dark green crystals was 19 percent, m.p. 253°–254°C. dec.

In the preparation of photographic emulsions, the dyes described herein are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol, isopropanol pyridine, etc. alone or in combination are satisfactory as solvents for the dyes described herein. The type of silver halide emulsions that are sensitized with the dyes include any of those prepared with hydrophilic colloids that are known to be satisfactory for dispersing light-sensitive silver halides, for example, emulsions prepared with hydrophilic colloids, such as natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, etc.

The concentration of the dyes described herein in the emulsion can vary widely, typically from about 10 to about 600 mgs. per mole of silver halide. The specific concentration will vary according to the type of light-sensitive material in the emulsion and according to the effects desired. The most advantageous dye concentration for any given emulsion can be readily determined by making the tests and observations customarily used in the art of emulsion making.

To prepare a gelatino-silver halide emulsion sensitized with one of the dyes described herein, the following procedure is satisfactory: A quantity of the dye is dissolved in a suitable solvent, and a volume of this solution containing from 10 to 600 mgs. of dye per mole of silver halide is slowly added with intimate mixing to a mole of a gelatino-silver halide emulsion. With most of the dyes, 50 to 200 mgs. of dye per mole of silver halide suffices to produce the maximum sensitizing effect with the ordinary gelatino-silver bromide (including bromoiodide and chlorobromide) emulsions. With fine-grain emulsions which include most of the ordinarily employed gelatino-silver chloride emulsions, somewhat larger concentrations of dye may be necessary to secure the optimum sensitization. While the preceding has dealt with emulsions comprising gelatin, it will be understood that these remarks apply generally to any emulsions in which a part or all of the gelatin is substituted by another suitable hydrophilic colloid such as previously mentioned.

The above statements are only illustrative and are not to be understood as limiting in any sense, as it will be apparent that the dyes can be incorporated by other methods in many of the emulsions customarily used in the art. For instance, the dyes can be incorporated by bathing a plate or film bearing an emulsion, in a solution of the dye.

Photographic silver halide emulsions, such as those listed above, containing the sensitizing dyes described herein can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W. D. Baldsiefen, U.S. Pat. No. 2,540,085, granted Feb. 6, 1951; R. E. Damschroder, U.S. Pat. No. 2,597,856, granted May 27, 1952; and H. C. Yutzy, et al., U.S. Pat. No. 2,597,915, granted May 27, 1952), various palladium compounds, such as palladium chloride (W. D. Baldsiefen, U.S. Pat. No. 2,540,086, granted Feb. 6, 1951), potassium chloropalladate (R. E. Stauffer, et al., U.S. Pat. No. 2,598,079, granted May 27, 1952), etc., or mixture of such sensitizers; antifoggants, such as ammonium chloroplatinate (A. P. H. Trivelli, et al., U.S. Pat. No. 2,566,245, granted Aug. 28, 1951), ammonium chloroplatinite (A. P. H. Trivelli, et al., U.S. Pat. No. 2,566,263, granted Aug. 28, 1951), benzotriazole, nitrobenzimidazole, 5-nitroindazole, benzidine, mercaptans, etc. (see Mees, The Theory of the Photographic Process, MacMillan Pub., 1942, p. 460), or mixtures thereof; hardeners, such as formaldehyde (A. Miller, U.S. Pat. No. 1,763,533, granted June 10, 1930), chrome alum. (U.S. Pat. No. 1,763,533), glyoxal (J. Brunken, U.S. Pat. No. 1,870,354, granted Aug. 9, 1932), dibromacrolein (O. Block, et al., Great Britain 406,750, accepted Mar. 8, 1934), etc.; color couplers, such as those described in I. F. Salminen, et al., U.S. Pat. No. 2,423,730, granted July 7, 1947; Spence and Carroll, U.S. Pat. No. 2,640,776, issued June 2, 1953, etc.; or mixtures of such addenda. Dispersing agents for color couplers, such as those set forth in U.S. patents to E. E. Jelley, et al., U.S. Pat. No. 2,322,027, granted June 15, 1943, and L. D. Mannes, et al., U.S. Pat. No. 2,304,940, granted Dec. 15, 1942, can also be employed in the above-described emulsions.

The emulsions are coated to advantage on any of the materials used for photographic elements including, for example, paper, glass, cellulose acetate, cellulose nitrate, synthetic film-forming resins, etc.

The following example shows the sensitizing effects of representative dyes described herein on silver halide emulsions.

Example 9

Representative dyes were each added, in sensitizing amounts ranging from about 80 mg. to about 140 mg. per mole of silver halide, to individual portions of a gelatino-silver bromoiodide emulsion containing 0.77 mole percent of silver iodide or a silver chlorobromide emulsion containing 40 mole percent of silver bromide (both of which are described by Trivelli and Smith, Photographic Science, vol. 79, 330 (1939)). After digesting for 10 minutes at 50°C., the emulsions were coated on a cellulose acetate support and dried. A sample of each coating was exposed on an Eastman 1B Sensitometer and to a wedge spectrogram. The exposed coatings were photographically developed for three minutes in Kodak Developer D-19 solution, fixed in a conventional sodium thiosulfate fixing both such as F-5, washed and dried. The sensitizing ranges and sensitizing maxima (both in nm) determined from the processed images are recorded with the dye and type of emulsion in the following table. The sensitizing amounts of dye that can be employed ranges from about 20 mg. to about 170 mg. per mole of silver halide.

| Example Number | Mg. of dye /gram mole of silver | Silver halide in emulsion | Sensitizing range (nm.) | max. (nm.) |
|---|---|---|---|---|
| 1 | 140 | Silver chlorobromide | to 640 | 600 |
| 2 | 80 | Silver bromoiodide | to 690 | 640 |
| 3 | 130 | Silver chlorobromide | 490 – 690 | 655 |
| 4 | 80 | Silver bromoiodide | to 630 | 605 |
| 5 | 90 | Silver bromoiodide | to 640 | 600 |
| 6 | 80 | Silver bromoiodide | to 655 | 620 |
| 7 | 80 | Silver bromoiodide | to 640 | 615 |
| 8 | 130 | Silver chlorobromide | 490 – 680 | 630 |

It will be understood that the examples given hereinbefore are illustrative and not limitative of the process of the invention. Thus, following the procedures given hereinbefore 3,3'-dimethyl-9-phenoxythiacarbocyanine iodide, 3,3'-di-n-butyl-9-phenoxythiacarbocyanine iodide, 3,3'-dioctadecyl-9-phenoxythiacarbocyanine iodide, 3,3'-di-n-butyl-9-phenoxy-4,5;4',5'-dibenzothiacarbocyanine p-toluenesulfonate, 3-ethyl-3'-n-butyl-9-phenoxythiacarbocyanine iodide, 3-ethyl-3'-methyl-9-phenoxyselenocarbocyanine iodide, 3,3'-diethyl-9-phenoxy-4,5:4',5'-dibenzoselenocarbocyanine p-toluenesulfonate and other dye compounds having the formula III, for example, can be prepared.

Kodak, D-19, F-5 and Eastman are registered trademarks of the Eastman Kodak Co., Rochester, New York.

The invention has been described in considerable detail with particular reference to certain preferred embodiments thereof, but it will be understood that variations and modifications can be effected within the spirit and scope of the invention as described hereinbefore and as defined in the appended claims.

We claim:

1. A process for preparing 9-aryloxycarbocyanine compounds having the formula:

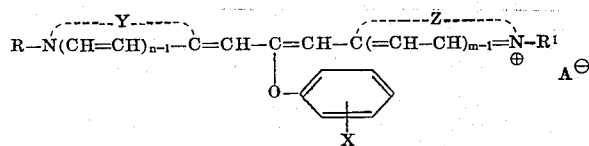

wherein R and $R^1$ are the same or different and each represents an alkyl group having 1 to 18 carbon atoms, a substituted alkyl group, an alkenyl group having 3 to 4 carbon atoms, or a phenyl group, Y and Z are the same or different and each represents the non-metallic atoms required to complete a 5- to 6-membered heterocyclic nucleus selected from the class consisting of a thiazole nucleus, a benzothiazole nucleus, a naphthothiazole nucleus, a thianaphtheno-7',6', 4,5-thiazole nucleus, an oxazole nucleus, a benzoxazole nucleus, a naphthoxazole nucleus, a selenazole nucleus, a benzoselenazole nucleus, a naphthoselenazole nucleus, a thiazoline nucleus, a thiazolidine nucleus, a 2-pyridine nucleus, a 4-pyridine nucleus, a 2-quinoline nucleus, a 4-quinoline nucleus, a 1-isoquinoline nucleus, a 3-isoquinoline nucleus, a 3,3-dialkylindolenine nucleus, an imidazole nucleus a benzimidazole nucleus and a naphthimidazole nucleus, X represents a hydrogen atom, a halogen atom, an alkyl group or an alkoxy group, m and n each represents 1 or 2 and A⁻ represents a non-metallic acid anion which comprises reacting a 9-alkylthiocarbocyanine compound having the formula:

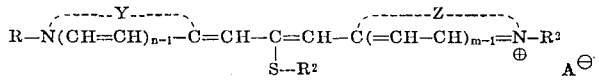

wherein R, R¹, Y, Z, m, n and A⁻ are as defined hereinbefore and R² represents an alkyl group with a molar excess of a phenol having the formula:

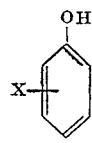

wherein X is as defined hereinbefore in the presence of a basic condensing agent at an elevated temperature.

2. A process in accordance with claim 1 wherein the molar proportion of the phenol is about 20 to about 75 times that of the 9-alkylthiocarbocyanine compound.

3. A process in accordance with claim 1 wherein the molar proportion of the phenol is about 30 to 55 times that of the 9-alkylthiocarbocyanine compound.

4. A process in accordance with claim 1 wherein the reaction is carried out at the reflux temperature of the reaction mixture.

5. A process in accordance with claim 2 wherein the reaction is carried out at the reflux temperature of the reaction mixture.

6. A process in accordance with claim 3 wherein the reaction is carried out at the reflux temperature of the reaction mixture.

7. A process in accordance with claim 1 wherein the reaction is carried out in a heat conductive reaction vessel in which at least a portion of the reaction vessel which is in contact with the reaction mixture is heated until the external surface temperature thereof is in the range of about 235°C. to about 245°C.

8. A process in accordance with claim 2 wherein the reaction is carried out in a heat conductive reaction vessel in which at least a portion of the reaction vessel which is in contact with the reaction mixture is heated until the external surface temperature thereof is in the range of about 235°C. to about 245°C.

9. A process in accordance with claim 3 wherein the reaction is carried out in a heat conductive reaction vessel in which at least a portion of the reaction vessel which is in contact with the reaction mixture is heated until the external surface temperature thereof is in the range of about 235°C. to about 245°C.

10. A process in accordance with claim 1 for preparing 3,3'-diethyl-9-phenoxythiacarbocyanine iodide which comprises reacting 3,3'-diethyl-9-ethylthiothiacarbocyanine iodide with a molar excess of phenol in the presence of a basic condensing agent at an elevated temperature.

11. A process in accordance with claim 10 wherein the molar proportion of phenol is about 20 to about 75 times that of the 9-ethylthiothiacarbocyanine compound.

12. A process in accordance with claim 10 wherein the molar proportion of phenol is about 30 to about 55 times that of the 9-ethylthiothiacarbocyanine compound.

13. A process in accordance with claim 1 for preparing 3,3'-diethyl-9-phenoxy-4,5;4',5'-dibenzothiacarbocyanine ethylsulfate which comprises reacting 3,3'-diethyl-9-ethylthio-4,5;4',5'-dibenzothiacarbocyanine ethylsulfate with a molar excess of phenol in the presence of base condensing agent at an elevated temperature.

14. A process in accordance with claim 13 wherein the molar proportion of phenol is about 20 to about 75 times that of the dibenzothiacarbocyanine compound.

15. A process in accordance with claim 13 wherein the molar proportion of phenol is about 30 to about 55 times that of the dibenzothiacarbocyanine compound.

16. A process in accordance with claim 1 for preparing 3,3'-dimethyl-9-phenoxy-4,5;4',5'-dibenzothiacarbocyanine p-toluenesulfonate which comprises reacting 3,3'-dimethyl-9-methylthio4,5;4',5'-dibenzothiacarbocyanine p-toluenesulfonate with a molar excess of phenol in the presence of a basic condensing agent at an elevated temperature.

17. A process in accordance with claim 16 wherein the molar proportion of phenol is about 20 to about 75 times that of the dibenzothiacarbocyanine compound.

18. A process in accordance with claim 16 wherein the molar proportion of phenol is about 30 to about 55 times that of the dibenzothiacarbocyanine compound.

19. A process in accordance with claim 1 for preparing 3,3'-diethyl-9-phenoxy-4,5-benzothiacarbocyanine iodide which comprises reacting 3,3'-diethyl-9-ethylthio-4,5-benzothiacarbocyanine iodide with a molar excess of phenol in the presence of a basic condensing agent at an elevated temperature.

20. A process in accordance with claim 19 wherein the molar proportion of phenol is about 20 to about 75 times that of the benzothiacarbocyanine compound.

21. A process in accordance with claim 19 wherein the molar proportion of phenol is about 30 to about 55 times that of the benzothiacarbocyanine compound.

22. A process in accordance with claim 1 for preparing 3,3'-diethyl-9-phenoxyselenathiacarbocyanine iodide which comprises reacting 3,3'-diethyl-9-ethylthioselenathiacarbocyanine iodide with a molar excess of phenol in the presence of a basic condensing agent at an elevated temperature.

22. A process in accordance with claim 22 wherein the molar proportion of phenol is about 20 to about 75 times that of the 9-ethylthioselenathiacarbocyanine compound.

24. A process in accordance with claim 22 wherein the molar proportion of phenol is about 30 to about 55 times that of the 9-ethylthioselenathiacarbocyanine compound.

* * * * *